United States Patent [19]

Hedrick

[11] Patent Number: 5,755,387
[45] Date of Patent: May 26, 1998

[54] SPREADER ASSEMBLY

[76] Inventor: David R. Hedrick, 425 South St.. Galion, Ohio 44833

[21] Appl. No.: 589,467

[22] Filed: Jan. 22, 1996

[51] Int. Cl.$^6$ ................................................. A01C 19/00
[52] U.S. Cl. ......................................... 239/657; 239/674
[58] Field of Search .................................. 239/664, 672, 239/681, 683, 687, 647, 676, 657

[56] References Cited

U.S. PATENT DOCUMENTS

| | | | |
|---|---|---|---|
| 2,813,722 | 11/1957 | Pawela | 239/672 |
| 3,189,355 | 6/1965 | Swanson et al. | 239/687 |
| 4,169,559 | 10/1979 | McKee | 239/687 |

FOREIGN PATENT DOCUMENTS

| | | | |
|---|---|---|---|
| 481485 | 4/1992 | European Pat. Off. | 239/683 |
| 2098443 | 11/1982 | United Kingdom | 239/672 |

*Primary Examiner*—Kevin Weldon
*Attorney, Agent, or Firm*—Thomas S. Baker, Jr.

[57] ABSTRACT

A spreader assembly for use with a dump-truck vehicle has a conventional spinner unit, an outer trough member mounted on the vehicle body with an outlet opening over the spinner unit, an inner trough member contained within the outer trough member and positioned with a discharge chute projected through the outer trough member outlet opening, and a hydraulic motor connected to the inner trough member for reciprocating the inner trough member with respect to the outer trough member to move materials to the spinner unit.

3 Claims, 3 Drawing Sheets

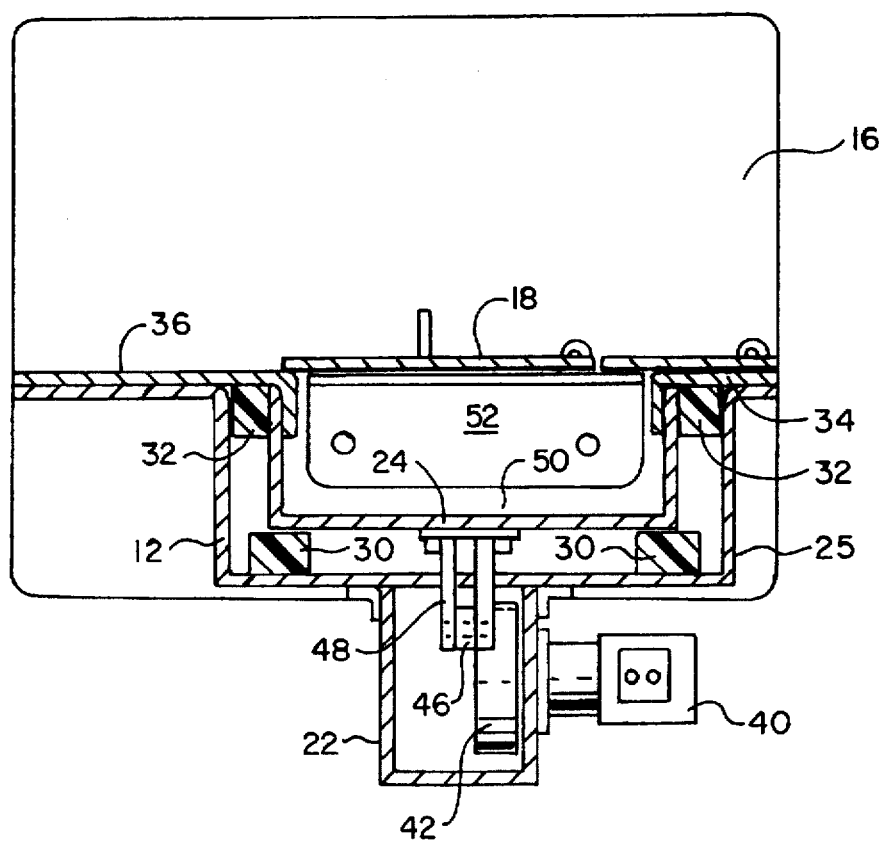

SPREADER ASSEMBLY

FIELD OF THE INVENTION

This invention relates generally to roadway maintenance equipment, and particularly concerns a spreader assembly which may be readily mounted adjacent the tail gate of a conventional dump truck vehicle and advantageously utilized for spreading numerous different particulate roadway maintenance materials.

BACKGROUND OF THE INVENTION

Many different designs and makes of dump truck-mounted roadway maintenance spreader assemblies are known and are readily available in the truck equipment marketplace. Such assemblies make use of rotating auger devices for moving particulate materials received from the dump truck tailgate opening to the assembly outlet for distribution by the assembly spinner unit component. Also, such assemblies, because of their use of auger devices, have proven to be susceptible to jamming by foreign objects contained in the particulate material being spread, and consequently unnecessarily hazardous to equipment operators who attempt to relieve the jamming condition without first inactivating the operating equipment.

A principal objective of the present invention therefore is to provide a dump truck-mounted spreader assembly with an arrangement of operating components which do not expose the equipment operator to risk of injury if attempting to unsafely remove unwanted materials from the assembly during periods of assembly operation.

Other objects and advantages of the present invention will become apparent during a careful consideration of the drawing, detailed description, and claims which follow.

SUMMARY OF THE INVENTION

The spreader assembly of the present invention is comprised of a conventional spinner unit, a truck-mounted outer trough which has end plate closures and which is positioned with its outlet opening above the spinner unit, an inner trough slidably mounted within the outer trough and having a discharge chute projected through the outlet opening of the outer trough, and a hydraulic motor that is supported by the outer trough and that is coupled to the inner trough to provided it with vibratory motion during assembly operation. During operation of the unit, particulate material dumped into the inner trough from the truck body tail-gate is moved by oscillation or vibratory shaking toward the inner trough discharge chute where it then falls by gravitational forces to the spinner unit for spreading.

DESCRIPTION OF THE DRAWINGS

FIG. 4 is a sectional view taken at line 4—4 of FIG. 3.

DETAILED DESCRIPTION

Figure 1:
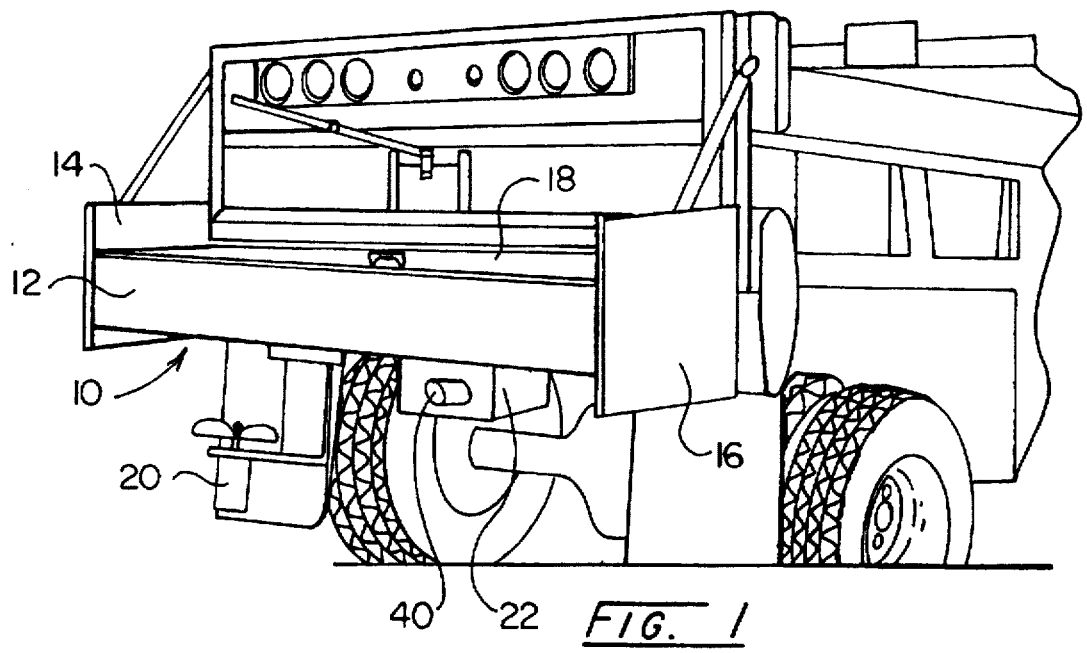
FIG. 1 is a perspective view of a portion of a conventional dump-truck vehicle having a preferred embodiment of the spreader assembly of the present invention mounted on the truck body beneath the truck body tail-gate feature.

FIG. 1 illustrates a portion of a conventional dump truck vehicle having a preferred embodiment of the spreader assembly 10 of the present invention mounted on the truck body so as to receive particulate material from the truck dump box through the truck's conventional tail-gate opening. As shown in FIG. 1, assembly 10 includes a U-shaped outer trough component 12 defined by a bottom wall 13 and a pair of side walls 15 and provided with end closure plates 14 and 16, with a hinged trough "dump-over" lid 18 illustrated in its closed condition. Assembly 10 also includes a conventional spinner unit 20 mounted on component 12, and a motor box 22 mounting a conventional hydraulic motor and drive connection which, when selectively operated, causes particulate material to be dumped into assembly 10 from the truck tail-gate opening. The material is moved along a vibrated U-shaped inner trough component 24 defined by a bottom wall 23 and a pair of side walls 25 (see FIGS. 3 and 4) described in detail hereinbelow to be discharged to spinner unit 20 for spreading. The roadway maintenance particulate materials typically spread by assembly 10 include sand, cinders, gravel, stone chips, salt, and the like.

Figure 3:
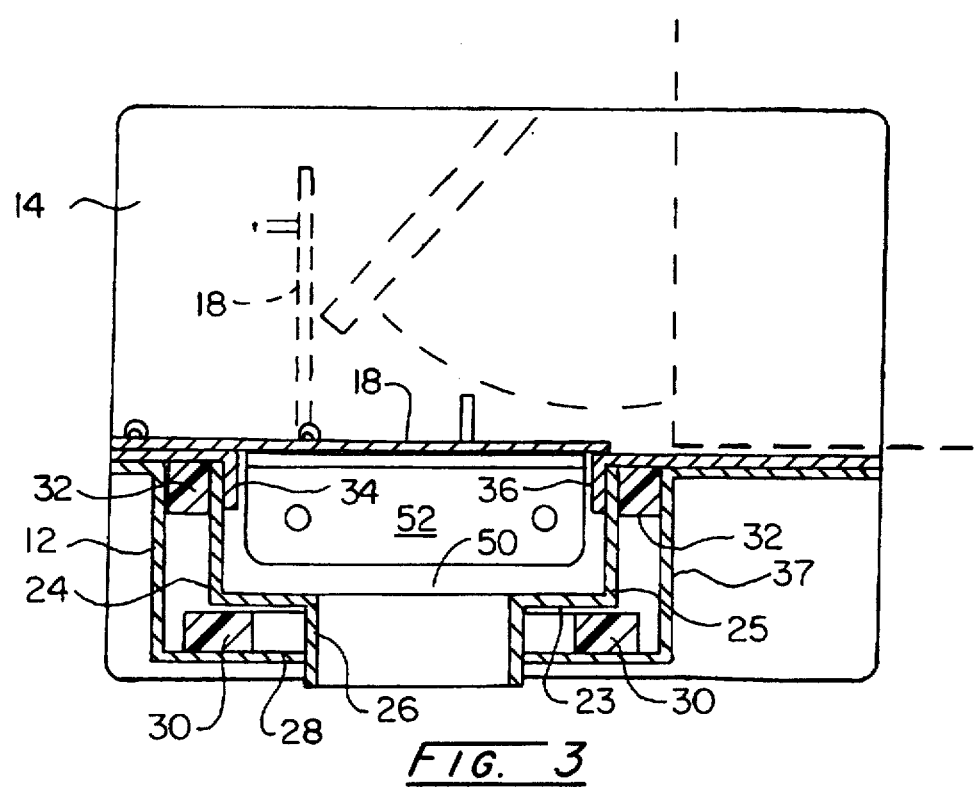
FIG. 3 is a sectional view taken at line 3—3 of FIG. 2.
Figure 2:
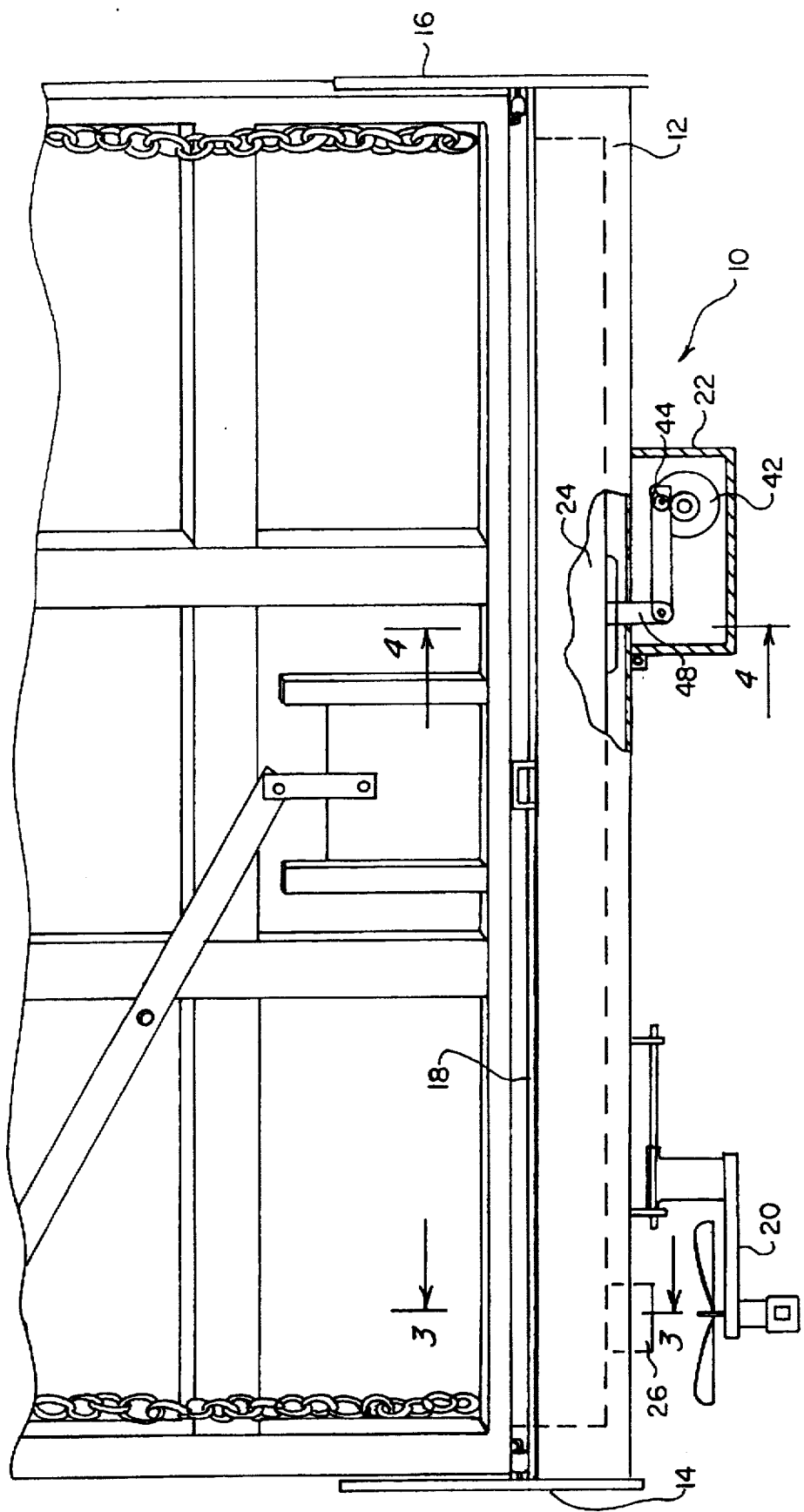
FIG. 2 is a rear elevation view of the equipment installation of FIG. 1.

Referring to FIG. 2 and 3, inner trough component 24 has an integral discharge chute 26 which is positioned in assembly 10 generally above spinner unit 20 and which projects below a surrounding opening 28 provided in the lower extremity of outer trough component 12. Inner trough component 24 is supported upon and guided by lower and upper friction-reducing bearing blocks 30 and 32 which are preferably formed of a thermosetting resinous material. Bearing blocks 30 and 32 mount inner trough component 24 and space that component from said outer trough component 12. Also, assembly 10 is provided with cross-sectionally angled seal plates 34 and 36 which cover the gaps between the vertical side walls of inner trough 24 and outer trough 12 respectively to prevent particulate materials being dumped into assembly 10 from entering the enclosed space containing bearing blocks 30 and 32.

Details of the motor box installation 22 and its connection to inner trough component 24 are best seen in FIGS. 2 and 4. A conventional hydraulic motor 40 is mounted on box 22 and its shaft is coupled to a wheel 42 which essentially functions as a crank arm because of its pivoted connection 44 to a link element 46. Link element 46 is pivotally connected at its opposite end to a bracket fitting 48 which is connected to the underside of inner trough component 24. Thus, rotation of the shaft of hydraulic motor 40 causes a reciprocating or oscillatory motion of inner trough component 24 relative to bearing blocks 30 and 32 and relative to outer trough component 12. I have found it to be satisfactory for many spreader assembly operations if inner trough component 24 is reciprocated throughout a total stroke of approximately 3 inches, or 1½ inches to either side of a central position whereat discharge chute 26 is centered in the outlet opening 28 provided in the bottom of outer trough component 12.

Lastly, in order to prevent particulate material from spilling from the ends of inner trough component 24 into the enclosed space containing bearing blocks 30 and 32, I provide an end closure adjacent each end of inner trough component 24. Each such closure is comprised of a "wiper" plate 50, preferably fabricated of a thermosetting resinous polymer, sandwiched between and secured to a pair of support plates 52, one of which is shown in each of FIGS. 3 and 4. Although not shown in the drawings, properly positioned support plates 52 are, in turn, supported by other structure of assembly 10 such as either sealing plates 34,36, or end closures 14,16.

By use of a vibrating inner trough component 24 to distribute received material to its discharge chute 26 rather than a conventional auger device the risk of operator injury in a foreign object clearing operation is virtually eliminated even though the clearing operation should be carried out while the equipment is operating.

Various changes may be made to the size, shape, and materials of the different components of the disclosed spreader assembly without departing from the scope or meaning of the invention which I claim.

I claim my invention as follows:

1. A spreader assembly for mounting on a dump-truck vehicle to receive and spread particulate materials utilized in roadway maintenance operations, and comprising:

an outer trough component having a longitudinal axis, a generally U-shaped cross-sectional configuration having two sides and a base, and an outlet opening in its base;

an inner trough component contained within said outer trough component in spaced-apart relation and having a discharge chute element positioned at and extending through said outer trough component outlet opening;

a spinner unit pivotally mounted on said outer trough component below said inner trough component discharge chute element;

motor means supported by said outer trough component and connected in reciprocation-causing relation to said inner trough component; and end-plate means closing the ends of said outer trough component U-shaped cross-sectional configuration at the extremes of said outer trough component longitudinal axis and being adapted to be rigidly secured to the sides of the dump-truck vehicle, said inner trough component and its discharge chute element being reciprocated by said motor means centrally of said outer trough component outlet opening, in directions parallel to said outer trough component longitudinal axis, and relative to said outer trough component, said spinner unit, and said end-plate means when said motor means is actuated.

2. The spreader assembly of claim 1 further comprising bearing blocks which mount said inner trough component and space said inner trough component from said outer trough component.

3. The spreader assembly of claim 1 wherein each of said inner and outer trough components are defined by a bottom wall and a pair of side walls; and seal plates which overlie at least one side wall of said inner and outer trough components to prevent particulate material from entering the space therebetween.

* * * * *